United States Patent
Thackston et al.

(10) Patent No.: US 11,351,671 B2
(45) Date of Patent: Jun. 7, 2022

(54) INTENT BASED CONTROL OF A ROBOTIC DEVICE

(71) Applicant: TOYOTA RESEARCH INSTITUTE, INC., Los Altos, CA (US)

(72) Inventors: Allison Thackston, San Jose, CA (US); Samuel Zapolsky, Mountain View, CA (US); Katarina Miller, Palo Alto, CA (US); Laura Stelzner, Mountain View, CA (US); Ron Goldman, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 311 days.

(21) Appl. No.: 16/173,866

(22) Filed: Oct. 29, 2018

(65) Prior Publication Data

US 2020/0130190 A1    Apr. 30, 2020

(51) Int. Cl.
*B25J 9/16* (2006.01)
*G05D 1/00* (2006.01)

(52) U.S. Cl.
CPC ........... *B25J 9/1689* (2013.01); *B25J 9/1697* (2013.01); *G05D 1/0016* (2013.01); *G05D 1/0038* (2013.01); *G05D 2201/0217* (2013.01)

(58) Field of Classification Search
CPC combination set(s) only.
See application file for complete search history.

(56) References Cited

U.S. PATENT DOCUMENTS

| | | | |
|---|---|---|---|
| 8,682,485 B2 | 3/2014 | Anhalt et al. | |
| 9,789,605 B2 | 10/2017 | Meier et al. | |
| 2009/0210090 A1* | 8/2009 | Takemitsu | B25J 9/1661 901/1 |
| 2015/0290795 A1* | 10/2015 | Oleynik | G05B 19/42 700/257 |
| 2016/0055677 A1* | 2/2016 | Kuffner | B62D 57/032 345/633 |
| 2016/0075015 A1* | 3/2016 | Izhikevich | B25J 9/163 700/253 |
| 2017/0136621 A1* | 5/2017 | Benaim | G06F 3/013 |
| 2018/0092706 A1* | 4/2018 | Anderson | G06T 19/006 |
| 2019/0219972 A1* | 7/2019 | Gray | H04W 4/38 |
| 2019/0362557 A1* | 11/2019 | Lacey | G06F 3/012 |
| 2020/0078955 A1* | 3/2020 | Fernando | G06N 3/008 |

FOREIGN PATENT DOCUMENTS

CN    107097227 A    8/2017

OTHER PUBLICATIONS

Aronson, et al, "Eye-Hand Behavior in Human-Robot Shared Manipulation", 13th Annual ACM/IEEE International Conference on Human Robot Interaction, Mar. 5-8, 2018.
Hauser, "Recognition, Prediction, and Planning for Assisted Teleoperation of Freeform Tasks", Autonomous Robots, Nov. 2013, vol. 35, Issue 4, pp. 241-254.

* cited by examiner

*Primary Examiner* — Jeff A Burke
*Assistant Examiner* — Zachary Joseph Wallace
(74) *Attorney, Agent, or Firm* — Seyfarth Shaw LLP

(57) ABSTRACT

A method for controlling a robotic device includes monitor an action of an operator of the robotic device. The method also includes inferring an intended target based on the monitored action. The method further includes determining an intended action for the intended target. The method still further includes controlling the robotic device to perform the intended action.

19 Claims, 6 Drawing Sheets

INTENT BASED CONTROL OF A ROBOTIC DEVICE

BACKGROUND

Field

Certain aspects of the present disclosure generally relate to robotic devices and, more particularly, to a system and method for controlling a robotic device based on an operator's inferred intent.

Background

In one aspect of the present disclosure, a method for controlling a robotic device is disclosed. The method includes monitoring an action of an operator of the robotic device. The method also includes inferring an intended target based on the monitored action. The method further includes determining an intended action for the intended target. The method still further includes controlling the robotic device to perform the intended action.

Another aspect of the present disclosure is directed to an apparatus including means for monitoring an action of an operator of the robotic device. The apparatus also includes means for inferring an intended target based on the monitored action. The apparatus further includes means for determining an intended action for the intended target. The apparatus still further includes means for controlling the robotic device to perform the intended action.

In another aspect of the present disclosure, a non-transitory computer-readable medium with non-transitory program code recorded thereon is disclosed. The program code is for controlling a robotic device. The program code is executed by a processor and includes program code to monitor an action of an operator of the robotic device. The program code also includes program code to infer an intended target based on the monitored action. The program code further includes program code to determine an intended action for the intended target. The program code still further includes program code to control the robotic device to perform the intended action.

Another aspect of the present disclosure is directed to an apparatus for controlling a robotic device. The apparatus having a memory and one or more processors coupled to the memory. The processor(s) is configured to monitor an action of an operator of the robotic device. The processor(s) is also configured to infer an intended target based on the monitored action. The processor(s) is further configured to determine an intended action for the intended target. The processor(s) still further configured to control the robotic device to perform the intended action.

Intent based systems infer a user's intent and perform an action based on the inferred intent. For example, in a first-person shooter video game, the video game infers the location of the player's aim based on various factors, such as the player's in-game movement and available targets. Based on the inferred aim, the video game may automatically aim the player's weapon at the available target. Intent-based action generation is typically limited to video games. It is desirable to improve systems for controlling robotic devices by providing an intent-based system for controlling the robotic device based on an inferred intent of an operator.

SUMMARY

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
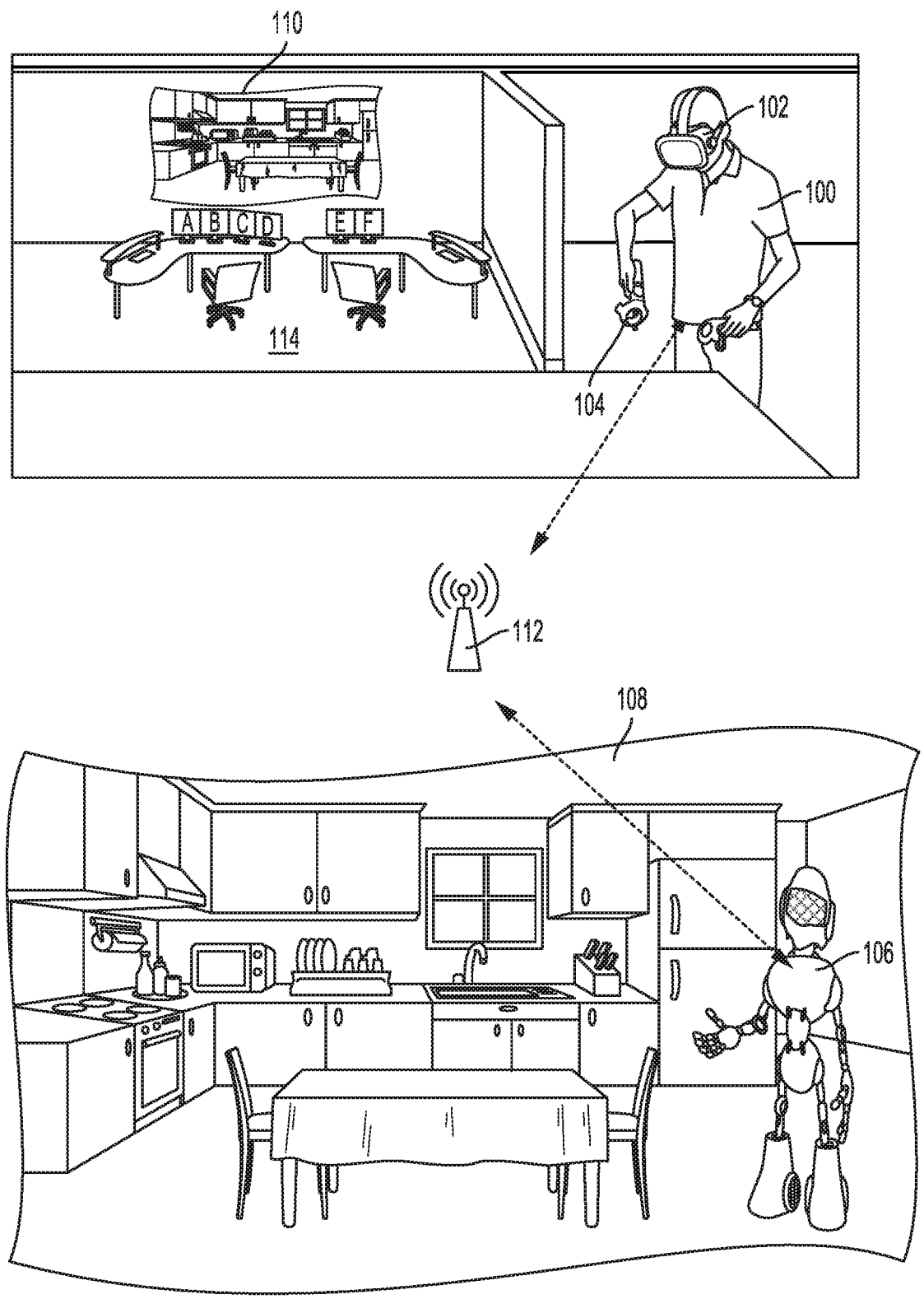
FIG. 1 illustrates an example of an operator controlling a robotic device according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

In conventional robotic systems, a robotic device may be trained based on human actions. For example, the robotic system may track the movements of a human pouring liquid into a cup. The human may look at the cup, look up, look down, and then pour into the cup. When performing a similar action, the robotic device may attempt to mimic the tracked movements. Tracking the movements may be difficult and may lead to unstable actions by the robotic device.

In some conventional systems, an action may be performed based on a user's inferred intent. For example, in a first-person shooter video game, the video game infers the location of the player's aim based on various factors, such as the player's in-game movement and available targets. Based on the inferred aim, the video game may automatically aim the player's weapon at the available target or interact with a nearby object, such as a door or a light switch. Intent-based action generation is typically limited to video game systems.

Aspects of the present disclosure are directed to inferring an intended action for a robotic device based on an operator's actions. In contrast to a video game, where auto-aim features may help a user interact with an available target, aspects of the present disclosure may control interactions with objects based on the inferred intent. For example, a robotic device may be controlled to pick up a specific object from multiple visible objects. In one configuration, the operator controls the robotic device from a remote location.

Aspects of the present disclosure are not limited to a particular type of robotic device. Various types of robotic devices with one or more vision systems that provide a vision/visualization output are contemplated. The vision output may be provided to the operator via a video feed. For example, a point-cloud representation may be overlain with respect to a video feed. On-screen indications may be further displayed with the video feed to communicate with the operator.

Based on the video feed, the operator may guide the robotic device through an environment. An intent-based system may infer an intended target and perform an action on the intended target. For example, the intent-based system may identify a most likely object (e.g., target) that the operator (e.g., user) intends to interact with. The intent-based system may also infer an intended action for the target.

The intended target may be inferred based on observations of the operator with respect to operating the robotic device. That is, one or more of a gaze tracking system, gesture tracking system, motion tracking system, and/or other action tracking system may monitor the operator's actions. The monitored actions may be used to identify the intended target. The target may be an object or a spatial location in an environment of the robotic device.

After inferring the target, the inference may be confirmed via an express confirmation by the operator or via an implicit confirmation based on the operator's subsequent actions. Once the inference is confirmed, the robotic device may interact with the target based on semantic task parsing. That is, the system may identify possible actions based on properties of the target, such as the type of target, surrounding targets, and/or environmental limitations, etc.

The possible actions may be predefined interaction options (e.g., modeled options) and/or learned options. Learned options are based on preceding actions of the robotic device or previous interactions with similar targets. As an example, an operator may control a robotic device in a dining environment. In this example, the operator controls the robotic device to place knives and forks on a dining table. The operator may then gesture towards a drawer with spoons. Based on the history of events (e.g., placing knives and forks on the table), the system may identify the drawer of spoons and infer that the spoons are the intended target. Furthermore, the system may infer that the operator intends to place the spoons on the table next to the forks and knives.

The system may request the operator to confirm that the spoons are the intended target. Alternatively, the operator's continued motion towards the spoon drawer may confirm the system's inference. Based on the express or implicit confirmation of the inference, the system may control the robotic device to grab the spoons and place the spoons on the table. Prior to controlling the robotic device to place the spoons on the table, the system may propose the intended action to the operator for approval. Alternatively, the action is performed without approval.

The action may be based on a learned action or a library of actions associated with the object (e.g., the spoon). For example, for a spoon, the library of actions may include setting the spoon on a table, using the spoon to scoop a surrounding object, or putting the spoon in a drawer for storage. The system may also use a combination of learned and modeled actions, such as adjusting the available modeled actions based upon a previously performed actions within a time frame. In one configuration, the spoon is placed at an appropriate position based on local norms.

FIG. 1 illustrates an example of an operator 100 controlling a robotic device 106 according to aspects of the present disclosure. As shown in FIG. 1, an operator 100 is provided with a vision system 102 and motion controllers 104 (e.g., gesture tracking system) for controlling a robotic device 106. The vision system 102 may provide a video feed as well as capture the operator's 100 gaze. The operator 100 may be in a location that is remote from a location of the robotic device 106. In the present example, the robotic device 106 is located in a kitchen 108 and the operator 100 is in a location that is different from the kitchen 108, such as a robot control center 114.

The vision system 102 may provide a video feed of the location of the robotic device 106. For example, the vision system 102 may provide a view of the kitchen 108 based on the robotic device's 106 forward perspective. Other perspectives, such as a 360° view may be provided. The perspectives are provided via one or more vision sensors, such as a video camera, of the robotic device 106. The vision system 102 is not limited to a head-set as shown in FIG. 1. The vision system 102 may also be a monitor 110, an image projector, or other system capable of displaying a video feed from the robotic device 106.

One or more actions of the robotic device 106 may be controlled via the motion controllers 104. For example, the motion controllers 104 capture the operator's 100 gestures and the robotic device 106 mimics the captured gestures. The operator 100 may control the robotic device's 106 locomotion, limb movement, and other actions via the motion controllers 104. Aspects of the present disclosure are not limited to capturing the operator's 100 gestures via the motion controllers 104. Other types of gesture capturing systems are contemplated. The operator 100 may control the robotic device 106 via a wireless connection 112. Additionally, the robotic device 106 may provide feedback, such as the video feed, to the operator 100 via the wireless connection 112.

Figure 2A:
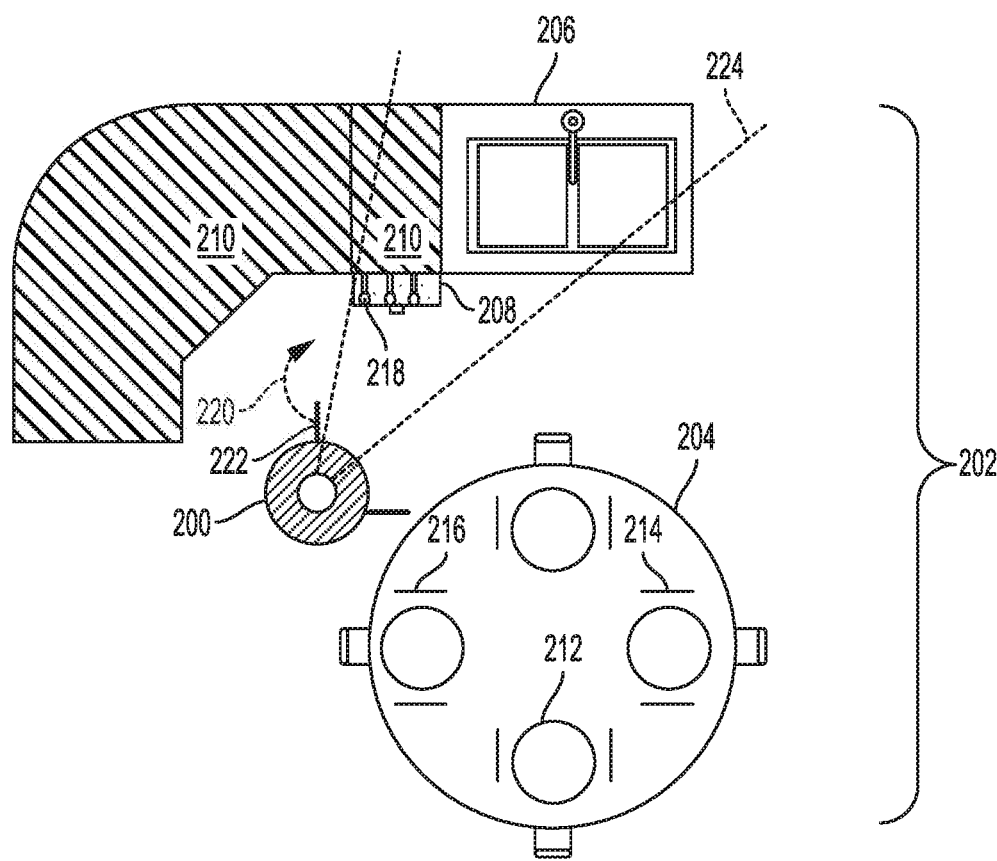
FIG. 2A illustrates an example of a robotic device operating in an environment according to aspects of the present disclosure.

FIG. 2A illustrates an example of an operator (not shown) controlling a robotic device 200 in a dining environment 202 according to aspects of the present disclosure. For clarity, FIG. 2A provides a top-down of the dining environment 202. As shown in FIG. 2A, the dining environment 202 includes a dining table 204, a sink 206, a drawer 208 with spoons 218, and a counter 210. The operator is at a location that is remote from the dining environment 202.

In the example of FIG. 2A, the robotic device 200 has been controlled to set plates 212, knives 214, and forks 216 on the dining table 204. After setting the plates 212, knives 214, and forks 216 on the dining table 204, the operator may gesture towards the spoons 218. The gesture may include one or more of a movement 220 of a limb 222 towards the spoons 218, directing a field of view 224 (e.g., gaze) towards the spoons 218, moving the robotic device 200 towards the spoons, and/or another action.

Figure 2B:
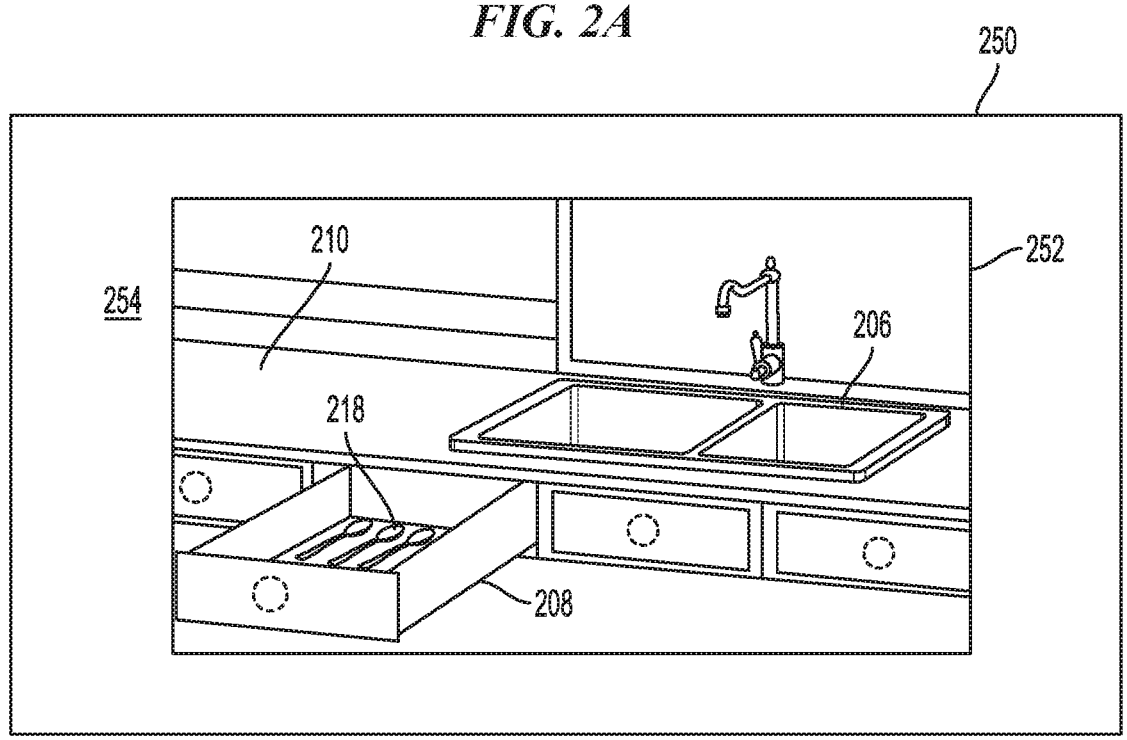
FIGS. 2B, 2C, and 2D illustrate examples of a video feed provided to an operator of a robotic device according to aspects of the present disclosure.

FIG. 2B illustrates an example of a display 250 provided to an operator according to aspects of the present disclosure. The display 250 may be a vision system, such as a head-set, a monitor, or other type of display. As shown in FIG. 2B, the display 250 includes a video feed 252 provided from a vision sensor of the robotic device 200. For example, based on the robotic device's 200 field of view 224, the video feed 252 displays the sink 206, counter 210, drawer 208, and spoons 218. In one configuration, a point-cloud representation (not shown) may be overlain with respect to the video feed 252. The operator may guide the robotic device 200 through an environment, such as the dining environment 202, based on the video feed 252.

The display 250 may also include an on-screen indication area 254 for providing notifications to the operator. For example, the on-screen indication area 254 provides notifications of inferred targets and/or inferred actions. As shown in FIG. 2B, the on-screen indication area 254 is distinct from the video feed 252. Alternatively, the on-screen indication area 254 may overlap with the video feed 252.

In one configuration, the intent-based system identifies potential targets within a vicinity of the robotic device 200. For example, the intent-based system identifies potential targets in the robotic device's 200 field of view 224. In this example, the sink 206, counter 210, drawer 208, and spoons 218 are identified as potential targets. From the potential targets, the intent-based system infers an intended target.

As discussed herein, the intended target may be inferred based on observations of the operator with respect to operating the robotic device 200. The inference may be based on a probabilistic determination. In one configuration, the probabilistic determination is based on previous actions and/or a current action (e.g., gesture, gaze, motion, etc.). For example, based on the previous actions (e.g., placing plates 212, knives 214, and forks 216 on the dining table 204) and the current action (e.g., gaze towards the spoons 218), the intent-based system may infer that the spoons 218 are the intended target.

Additionally, or alternatively, the inference may be based on an extrapolated motion. For example, a future path of the limb 222 may be predicted based on the current motion 220. In this example, an intended target is an object that intersects with the future path of the limb 222. That is, when the limb 222 is moving towards an object, the intent-based system assumes that the object is an intended target. Additionally, the intent-based system may be trained to infer targets based on supervised learning, unsupervised learning, simulations, etc.

Figure 2C:
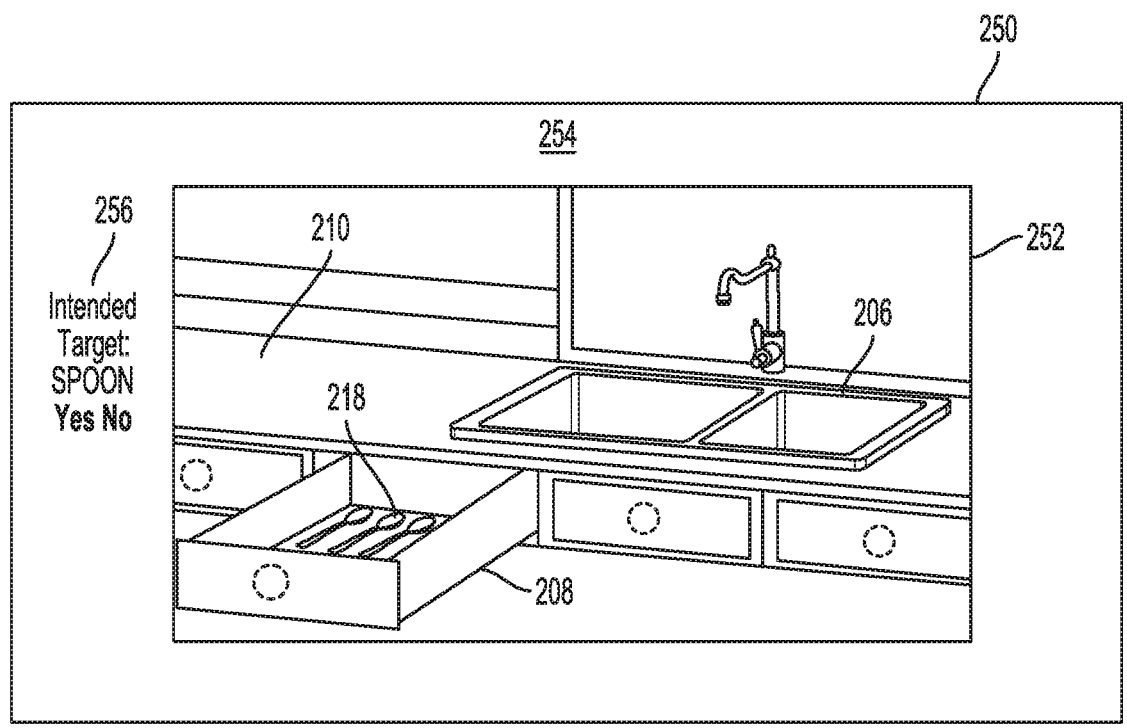

In one configuration, the intent-based system requests the operator to confirm that the spoons 218 are the intended target. FIG. 2C illustrates an example of requesting the operator to confirm the inferred intended target according to aspects of the present disclosure. As shown in FIG. 2C, a confirmation dialog 256 is displayed in the on-screen indication area 254. In this example, the operator confirms that the spoons 218 are the intended target via the confirmation dialog 256. The operator may confirm or deny the intended target by selecting the appropriate option in the confirmation dialog 256. A user interface, such as a motion controller, keyboard, mouse, or other input device may be used to select an option displayed in the confirmation dialog 256.

In another example, the confirmation dialog 256 provides a list of inferred intended targets ranked in order of likelihood. For example, the confirmation dialog 256 may list in order: spoons, sink, drawer, counter. The order of likelihood is based on a likelihood of the operator interacting with a target. In the present example, spoons have the highest likelihood and counter has the lowest likelihood. The operator may select the intended target from the ranked list.

In yet another configuration, the inferred intended target is highlighted in the video feed 252. The confirmation dialog 256 may be provided to confirm whether the highlighted target is the actual intended target. Aspects of the present disclosure are not limited to the confirmation dialog 256 as other methods of confirming the intended target are contemplated.

The operator may expressly confirm the inferred intended target via the confirmation dialog 256. Alternatively, the operator may implicitly confirm the inferred intended target based on a continued gesture, such as a motion, towards the inferred intended target. For example, the operator may continue to move a limb 222 of the robotic device 200 towards the spoons 218. As another example, the operator may focus, or zoom, the video feed 252 to the spoons 218. In yet another example, the operator may motion towards the sink 206. In this example, the intent-based system may change the inferred intended target from the spoons 218 to the sink 206. The continued gesture may affirm the inferred intended target.

Based on the express or implicit inference confirmation, the intent-based system may control the robotic device 200 to perform an action with the confirmed target. Semantic parsing may be used to determine an intended action for the identified object may be determined. For example, the intent-based system may determine the intended action is to grab the spoons 218 and place the spoons 218 on the table 204. Prior to controlling the robotic device 200 to place the spoons 218 on the table 204, the intent-based system may propose the intended action to the operator for approval.

Figure 2D:
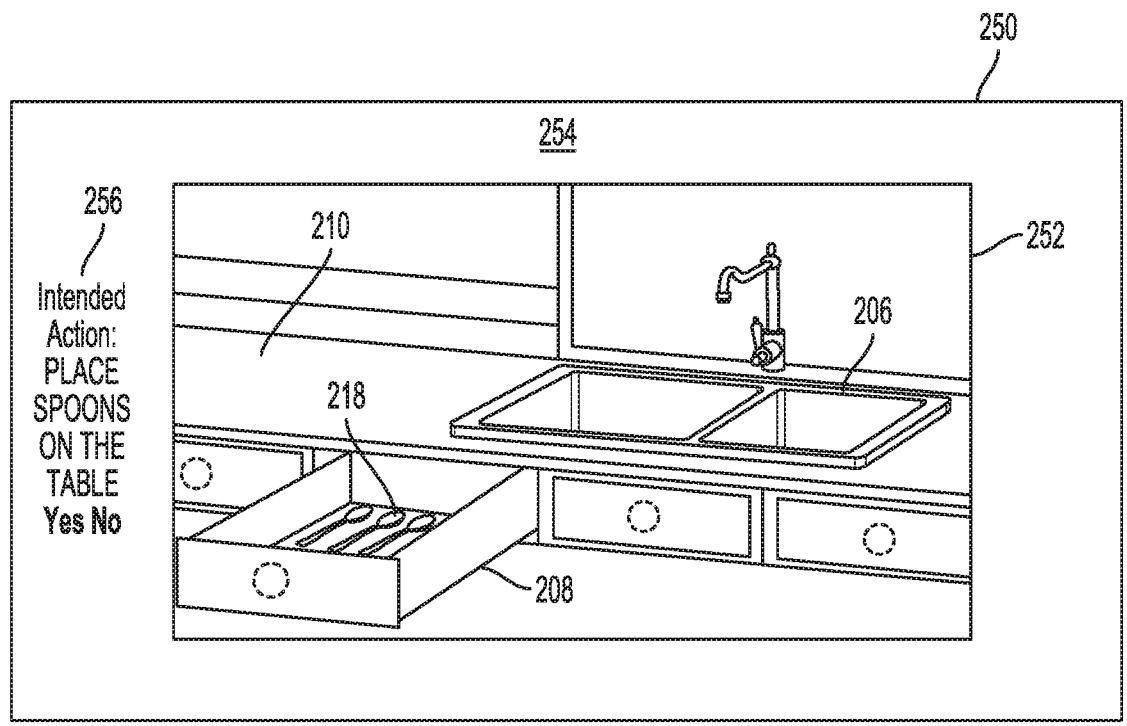

FIG. 2D illustrates an example of proposing the intended action to an operator according to aspects of the present disclosure. As shown in FIG. 2D, the confirmation dialog 256 displays the proposed action with a confirmation option. In this example, the operator uses the confirmation dialog 256 to confirm or deny that the intended action is to place the spoons 218 on the table 204. The operator may confirm or deny the intended action by selecting the appropriate option in the confirmation dialog 256.

In response to the action confirmation, the robotic device 200 grabs the spoons 218 and places the spoons 218 on the table 204 at their appropriate locations (e.g., next to the knives 214). In another configuration, the action is not proposed to the operator. Rather, the action is performed in response to confirmation of the intent. In one configuration, the robotic device 200 performs a preparatory action prior to receiving confirmation.

For example, upon inferring that the spoons 218 are the intended target, the robotic device 200 determines that it may need to grasp one or more of the spoons 218 to perform an action (e.g., place the spoons 218 on the table 204). As such, the robotic device 200 may open a hand attached to the limb 222 to prepare for grasping one or more spoons 218. As another example, the robotic device 200 may adjust a gesture or current motion to improve an action with the intended target. For example, upon inferring that the spoons 218 are the intended target, the robotic device 200 may adjust an angle of approach of a limb 222 to improve the grasping of the spoons 218. The adjustment of a gesture, motion, and/or limb may be based on libraries of modeled actions.

The action may be proposed based on a set of actions associated with the identified target. For example, the spoons 218 may have a set of associated actions, such as set on table, scoop food, place in drawer, and wash in sink. Based on previous actions and other factors, one or more associated actions may be eliminated from the set of actions for a current situation. For example, because the spoons 218 are in the drawer 208, the action "place in drawer" is eliminated from a set of possible actions for the spoons 218. Furthermore, if the robotic device 200 has not identified a food item in the vicinity of the spoons 218, the action "scoop food" may also be eliminated from a set of possible actions. Given the previous actions of placing plates 212, knives 214, and forks 216 on the dining table 204, the action "set on table" is selected as the most likely action from the remaining actions in the set of possible actions.

Figure 3:
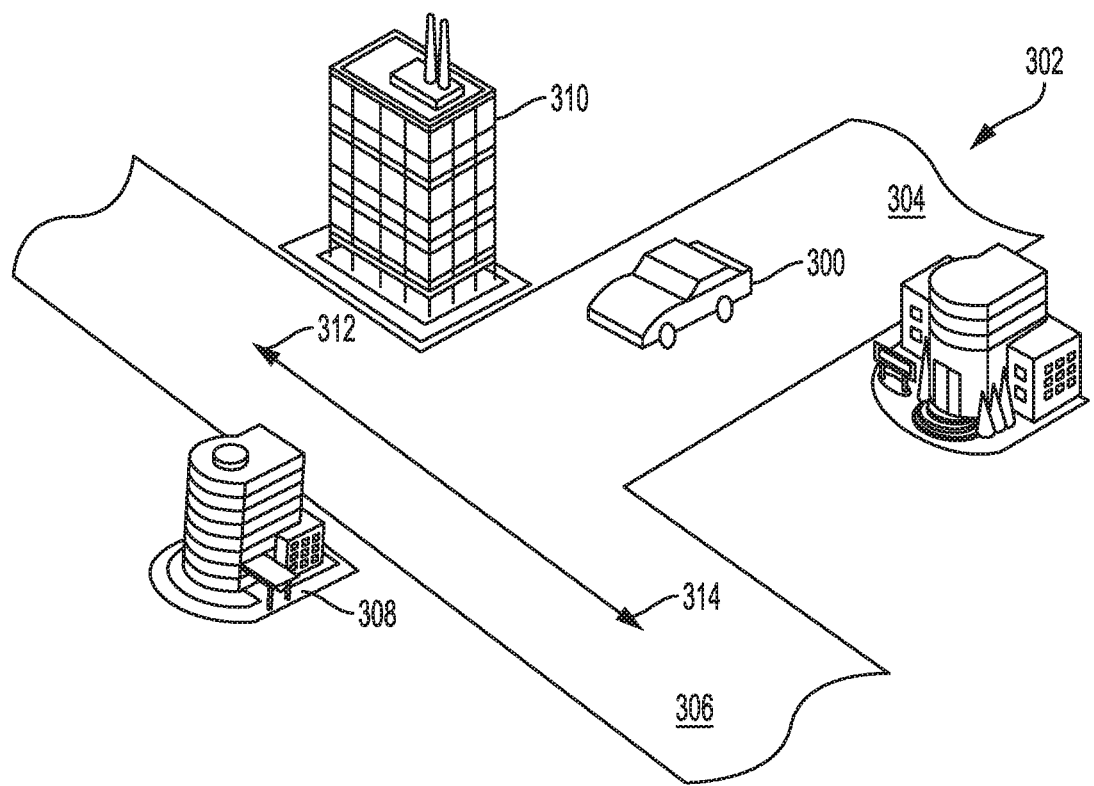
FIG. 3 illustrates an example of a robotic device operating in an environment according to aspects of the present disclosure.

The intent-based system is not limited to performing actions on identified targets. Aspects of the present disclosure may also be used for navigating an autonomous or semi-autonomous vehicle, such as a car. As shown in FIG. 3 an operator may control a vehicle 300 (e.g., autonomous vehicle) in an environment, such as a city 302, via a user interface, such as a remote control. The operator may be in a location that is remote from the location 302 of the vehicle 300. As discussed herein, the video feed may be provided to the operator via one or more sensors on the vehicle 300. The sensors may include a camera, such as a light detection and ranging (LiDAR) sensor, a radio detection and ranging (RADAR) sensor, and/or another type of sensor.

As shown in FIG. 3, the operator controls the vehicle 300 to move along a first street 304 towards an intersection with a second street 306. To avoid a collision with a first building 308, the vehicle 300 needs to turn right 312 or left 314 at the intersection. In one configuration, if the operator does not provide a command to turn right 312 or left 314 at the intersection, the intent-based system selects a direction based on inferred intent. That is, to avoid a collision, the intent-based system controls the vehicle 300. The intent-based system may also override an operator's input.

The decision to turn right 312 or left 314 may be based on a model that is trained to detect nuances in the operator's input. For example, when controlling the vehicle 300 to drive along the first street 304, the operator may veer towards one direction, such as right 312. Based on the trained model, the intent-based system infers that the operator does not intend to collide with a second building 310 that is to the right of the vehicle 300. Rather, the intent-based system infers that the operator intends to turn right 312 at the intersection. As such, the intent-based system controls the vehicle's 300 to perform a right turn at the intersection. In one configuration, the right turn may be performed without a reduction of the vehicle's 300 speed (e.g., velocity).

Figure 4:
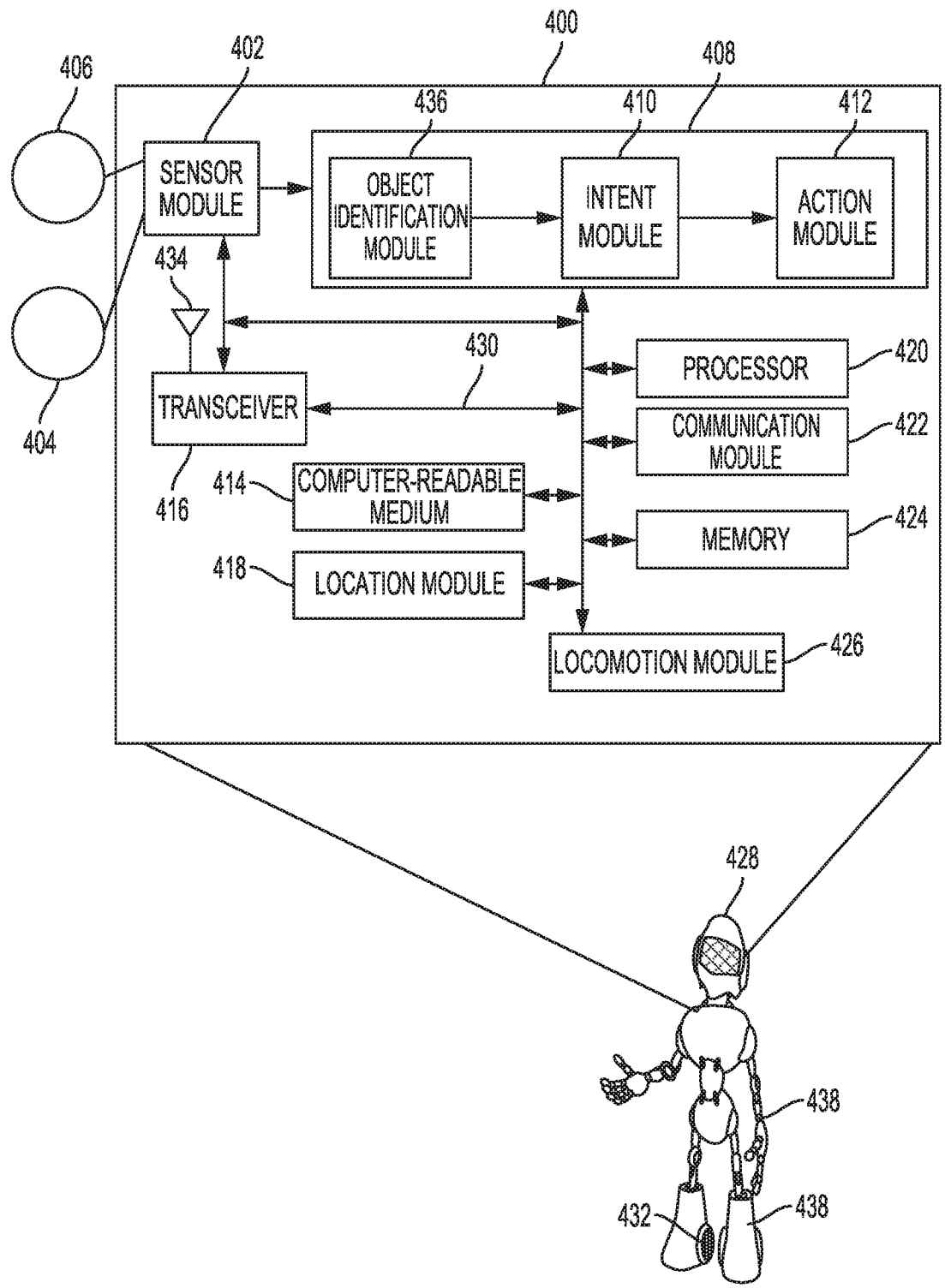
FIG. 4 is a diagram illustrating an example of a hardware implementation for an intent-based system according to aspects of the present disclosure.

FIG. 4 is a diagram illustrating an example of a hardware implementation for an intent-based system 400 according to aspects of the present disclosure. The intent-based system 400 may be a component of an autonomous or semi-autonomous system, such as a vehicle, a robotic device 428, or other device. In the example of FIG. 4, the intent-based system 400 is a component of the robotic device 428. The intent-based system 400 may be used to control an action of the robotic device 428 by inferring an intent of an operator of the robotic device 428.

The intent-based system 400 may be implemented with a bus architecture, represented generally by a bus 430. The bus 430 may include any number of interconnecting buses and bridges depending on the specific application of the intent-based system 400 and the overall design constraints. The bus 430 links together various circuits including one or more processors and/or hardware modules, represented by a processor 420, a communication module 422, a location module 418, a sensor module 402, a locomotion module 426, a memory 424, a intent-action module 408, and a computer-readable medium 414. The bus 430 may also link various other circuits such as timing sources, peripherals, voltage regulators, and power management circuits, which are well known in the art, and therefore, will not be described any further.

The intent-based system 400 includes a transceiver 416 coupled to the processor 420, the sensor module 402, the intent-action module 408, the communication module 422, the location module 418, the locomotion module 426, the memory 424, and the computer-readable medium 414. The transceiver 416 is coupled to an antennae 434. The transceiver 416 communicates with various other devices over a transmission medium. For example, the transceiver 416 may receive commands via transmissions from an operator of the robotic device 428. As discussed herein, the operator may be in a location that is remote from the location of the robotic device 428. As another example, the transceiver 416 may transmit inferred targets and/or inferred actions from the intent-action module 408 to the operator.

The intent-based system 400 includes the processor 420 coupled to the computer-readable medium 414. The processor 420 performs processing, including the execution of software stored on the computer-readable medium 414 providing functionality according to the disclosure. The software, when executed by the processor 420, causes the intent-based system 400 to perform the various functions described for a particular device, such as the robotic device 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or an RGB camera, for capturing 2D images. The second sensor 404 may be a ranging sensor, such as a LiDAR sensor or a RADAR sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the communication module 422, the location module 418, the locomotion module 426, the memory 424, in conjunction with the computer-readable medium 414 to implement the functionality described herein. In one configuration, the data captured by the first sensor 406 and the second sensor 404 may be transmitted as a video feed to the operator via the transceiver 416. The first sensor 406 and the second sensor 404 may be coupled to the robotic device 428 or may be in communication with the robotic device 428.

The location module 418 may be used to determine a location of the robotic device 428. For example, the location module 418 may use a global positioning system (GPS) to determine the location of the robotic device 428. The communication module 422 may be used to facilitate communications via the transceiver 416. For example, the communication module 422 may be configured to provide communication capabilities via different wireless protocols, such as WiFi, long term evolution (LTE), 3G, etc. The communication module 422 may also be used to communicate with other components of the robotic device 428 that are not modules of the intent-based system 400.

The locomotion module 426 may be used to facilitate locomotion of the robotic device 428 and/or components (e.g., limbs, hands, etc.) of the robotic device 428. As an example, the locomotion module 426 may control movement of the limbs 438 and/or wheels 432. As another example, the locomotion module 426 may be in communication with a power source of the robotic device 428, such as an engine or batteries. Of course, aspects of the present disclosure are not limited to providing locomotion via propellers and are contemplated for other types of components for providing locomotion, such as treads, fins, and/or jet engines.

The intent-based system 400 also includes the memory 424 for storing data related to operation of the robotic device 428 and the intent-action module 408. The modules may be software modules running in the processor 420, resident/stored in the computer-readable medium 414 and/or memory 424, one or more hardware modules coupled to the processor 420, or some combination thereof.

An intent-action module 408 may be in communication with the sensor module 402, the transceiver 416, the processor 420, the communication module 422, the location module 418, the locomotion module 426, the memory 424, and the computer-readable medium 414. In one configuration, the intent-action module 408 includes an intent module 410, an action module 412, and an object identification module 436. The object identification module 436 may identify objects near the robotic device 428. That is, based on an input received from the sensors 404, 406 via the sensor module 402, the object identification module 436 identifies objects (e.g., targets). The object identification module 436 may be a trained object classifier (e.g., artificial neural network).

The identified objects may be output to an intent module 410 to infer an intended target. That is, based on the identified objects and one or more operator actions received via the transceiver 416, the intent module 410 infers an intended target for the robotic device 428. The intended target, or a ranked list of intended targets, may be output to the transceiver 416 for subsequent confirmation by the operator.

Upon express or implicit confirmation by the operator, the action module 412 infers an intended action for the target. As discussed herein, actions may be predefined interaction options and/or learned options. Learned options are based on preceding actions of the robotic device 428 or previous interactions with similar targets. The preceding actions and/or previous interactions may be stored in the memory 424. Additionally, or alternatively, the predefined interaction options (e.g., a set of actions corresponding to the intended target) may be stored in the memory 424. Based on one or more of the predefined interaction options and/or learned options, an action is inferred for the object. The action may be output to the transceiver 416 for subsequent confirmation by the operator.

As previously discussed, the action may be performed upon confirmation by the operator. Alternatively, the intent-based system may bypass the action confirmation procedure and perform the action without a confirmation. In either configuration, the action is output to at least the locomotion module 426 to control the robotic device 428 to perform the action.

Figure 5:
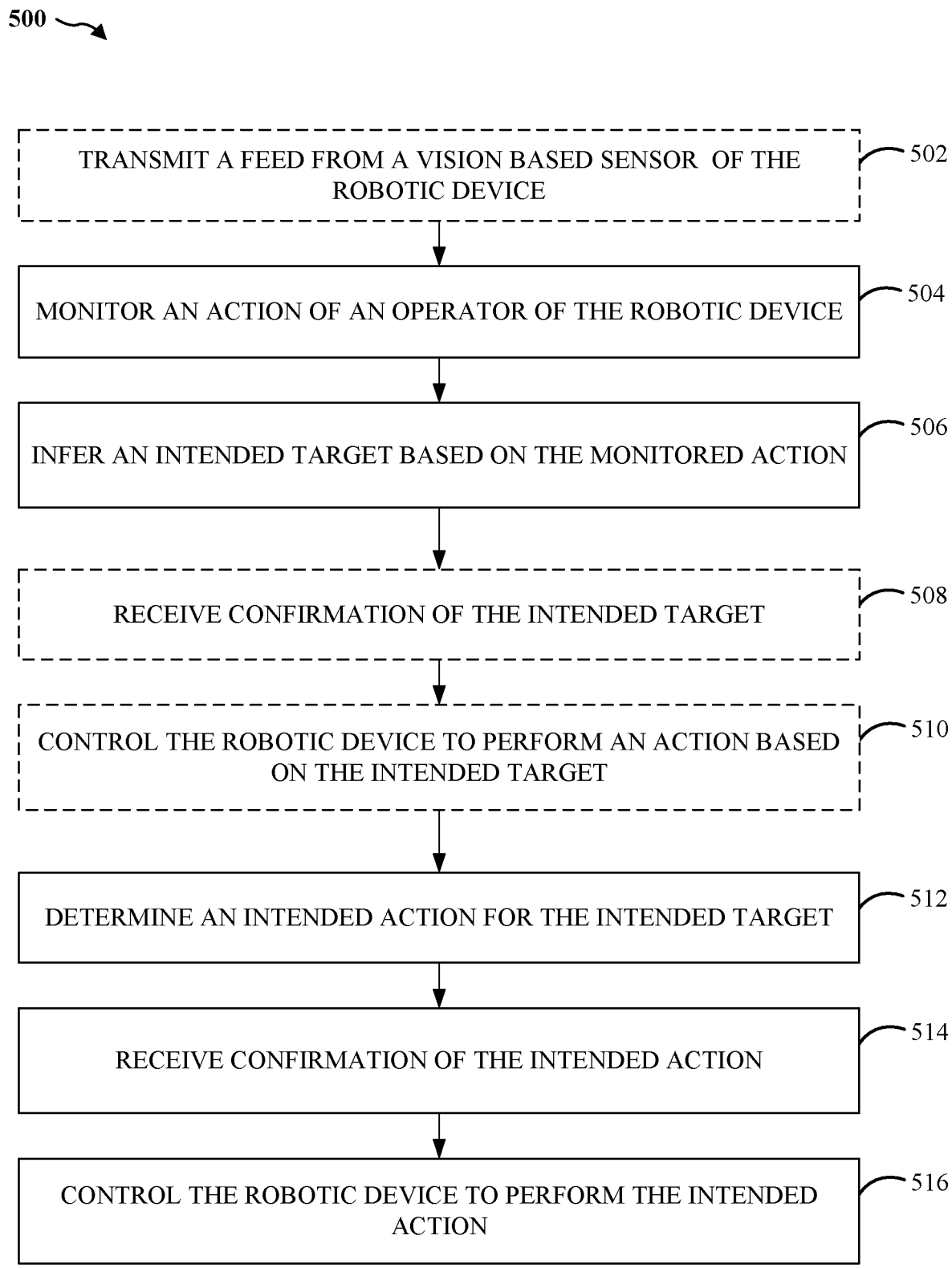
FIG. 5 illustrates a method for controlling a robotic device according to aspects of the present disclosure.

FIG. 5 illustrates a method 500 for controlling a robotic device according to an aspect of the present disclosure. In an optional configuration, at block 502, an intent-based system transmits a feed from a vision based sensor of the robotic device to an operator of the robotic device. Alternatively, an intent-based system transmits a feed from a virtual representation of the robot and its environment to an operator of a robotic device. This virtual representation may combine data from LiDAR, cameras, odometry, and other sources of robot telemetry and visual data. The operator may be at a location that is remote from the location of the robotic device. In one example, the operator is a human operator. The operator may be equipped with a vision system, such as a head-set, a monitor, an image projector, or other system capable of displaying a perspective of the robotic device to the operator.

At block 504, the intent-based system monitors an action of the operator. In one configuration, one or more of a gaze tracking system, gesture tracking system, a motion tracking system, and/or another type of action tracking system may track (e.g., monitor) actions of the operator. The monitored actions may be transmitted from one or more of the aforementioned systems to the intent-based system.

At block 506, the intent-based system infers an intended target based on the monitored action. The intended target is an object (e.g., most likely object) that the operator intends to interact with. The object is in an environment surrounding the robotic device. As such, because the operator may be remote from the robotic device, the operator controls the robotic device to interact with the object. The intended object is inferred by one or more actions, such as a gesture or gaze of the operator. The inference may also be based on a path of the robotic device. For example, if the operator controls a limb of the robotic device, the intended target is inferred from objects that may intersect with a path of the limb.

In an optional configuration, at block 508, the intent-based system receives a confirmation of the intended target.

For example, the inferred intended target, or a ranked list of inferred intended targets, may be transmitted to the operator's vision system. The operator may expressly confirm the intended target via a confirmation dialog screen. Alternatively, the intended target may be implicitly confirmed based on a continued action of the operator, or rejected based on an interruption of the action from the operator (e.g., opposing the suggested motion or moving away from the suggested target).

In this optional configuration, based on the express or implicit confirmation, at block 510, the intent-based system may control an action of the robotic device. For example, if the inferred target is a cup, the robotic device may open a grasping apparatus (e.g., hand) to receive the cup. Additionally, or alternatively, the robotic device may adjust its position or a position of a limb to improve the action. For example, the robotic device may adjust an angle of approach to grasp the cup from a desirable position. The actions may override the actions of an operator.

At block 512, the intent-based system determines an intended action for the intended target. The possible actions may be based on a modeled approach and/or learned approach. The learned approach may be based on preceding actions of the robotic device or previous interactions with similar targets. As an example, an operator may control a robotic device in a kitchen. In this example, the operator controls the robotic device to fill a bucket with soap and water. The operator may then gesture towards a mop. Based on the history of events (e.g., fill a bucket with soap and water), the system may identify the mop as the intended target. Once the intent-based system identifies that the operator intends to grasp the mop, the system may determine common grasp points on the mop (e.g., the handle) from a reference library of grasp locations on tools and infer that such a grasp location is where the operator intends to grasp the mop. Furthermore, the system may infer that the operator intends to place the mop in the bucket and then mop the floor.

The modeled approach is based on a library of actions associated with the object (e.g., mop). For example, for a mop, the library of actions may include putting the mop in a bucket of water, mopping the floor, squeeze the mop, or put the mop back in the closet. The intent-based system may use a combination of the learned and modeled approach.

In an optional configuration, at block 514, the intent-based system receives a confirmation of the intended action. Similar to the confirmation for the intended target, the intent-based system may transmit the intended action to a vision system of the operator. The operator may expressly confirm the option via a user input. Alternatively, the intent-based system may proceed without receiving the confirmation.

At block 516, the intent-based system controls the robotic device to perform the intended action. The control may include controlling a movement of one of more limbs of the robotic device, a direction of travel, or other action. The actions may be performed based on learned actions and/or actions from a modeled library.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints.

The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method performed by a robotic device, comprising:
monitoring for a movement of an operator of the robotic device;
identifying a current movement of the operator based on the monitoring;

inferring an intended object, for an action to be performed by the robotic device, from a plurality of objects within a current field of view of an environment based on the identified current movement and a first prior action performed with another object by the robotic device;

inferring an object type of the intended object, one or more other objects surrounding the intended object, and limitations of the environment;

determining the action to be performed with the intended object based on inferring the intended object and also inferring the object type, the one or more other objects surrounding the intended object, and the limitations of the environment; and performing, by the robotic device, the action with the intended object.

2. The method of claim 1, further comprising transmitting, to the operator, a feed of the current field of view from a vision sensor of the robotic device.

3. The method of claim 1, further comprising receiving, from the operator, confirmation of the intended object, in which the action is determined based on receiving the confirmation.

4. The method of claim 1, in which the action is further determined based on a learned approach or a combination of the learned approach and a modeled approach.

5. The method of claim 4, in which:
the learned approach is based on a second prior action of the robotic device; and
the modeled approach is based on a set of actions corresponding to the intended object.

6. The method of claim 1, further comprising receiving confirmation of the action in which the action is performed in response to the confirmation.

7. The method of claim 1, further comprising performing another action after inferring the intended object and prior to performing the action.

8. A robotic device, comprising:
a processor;
a memory coupled with the processor; and
instructions stored in the memory and operable, when executed by the processor, to cause the robotic device:
to monitor for a movement of an operator of the robotic device;
to identify a current movement of the operator based on the monitoring;
to infer an intended object, for an action to be performed by the robotic device, from a plurality of objects within a current field of view of an environment based on the identified current movement and a first prior action performed with another object by the robotic device;
to infer an object type of the intended object, one or more other objects surrounding the intended object, and limitations of the environment;
to determine the action to be performed with the intended object based on inferring the intended object and also inferring the object type, the one or more other objects surrounding the intended object, and the limitations of the environment; and
to perform the action with the intended object.

9. The robotic device of claim 8, in which execution of the instructions further cause the robotic device to transmit, to the operator, a feed of the current field of view from a vision sensor of the robotic device.

10. The robotic device of claim 8, in which:
execution of the instructions further cause the robotic device to receive, from the operator, confirmation of the intended target; and
the action is determined based on receiving the confirmation.

11. The robotic device of claim 8, in which execution of the instructions further cause the robotic device to determine the action based on a learned approach or a combination of the learned approach and a modeled approach.

12. The robotic device of claim 11, in which:
the learned approach is based on a second prior action of the robotic device; and
the modeled approach is based on a set of actions corresponding to the intended object.

13. The robotic device of claim 8, in which:
execution of the instructions further cause the robotic device to receive confirmation of the action; and
the action is performed based on receiving the confirmation.

14. The robotic device of claim 8, in which execution of the instructions further cause the robotic device to perform another action after inferring the intended object and prior to performing the action.

15. A non-transitory computer-readable medium having program code recorded thereon for controlling a robotic device, the program code executed by a processor and comprising:
program code to monitor for a movement of an operator of the robotic device;
program code to identify a current movement of the operator based on the monitoring
program code to infer an intended object, for an action to be performed by the robotic device, from a plurality of objects within a current field of view of an environment based on the identified current movement and a first prior action performed with another object by the robotic device;
program code to infer an object type of the intended object, one or more other objects surrounding the intended object, and limitations of the environment;
program code to determine the action to be performed with the intended object based on inferring the intended object and also inferring the object type, the one or more other objects surrounding the intended object, and the limitations of the environment; and
program code to perform the action with the intended object.

16. The non-transitory computer-readable of claim 15, in which the program code further comprises program code to transmit, to the operator, a feed of the current field of view from a vision sensor of the robotic device.

17. The non-transitory computer-readable of claim 15, in which:
the program code further comprises program code to receive, from the operator, confirmation of the intended target; and
the action is determined based on receiving the confirmation.

18. The non-transitory computer-readable of claim 15, in which the program code further comprises program code to determine the action based on a learned approach or a combination of the learned approach and a modeled approach.

19. The non-transitory computer-readable of claim 18, in which:
  the learned approach is based on a second prior action of the robotic device; and
  the modeled approach is based on a set of actions corresponding to the intended target.

* * * * *